United States Patent [19]
McAllister et al.

[11] Patent Number: 5,901,916
[45] Date of Patent: May 11, 1999

[54] TAPE CARTRIDGE REEL LOCK

[75] Inventors: Jeffrey S. McAllister; Thomas W. von Alten, both of Boise, Id.

[73] Assignee: Hewlett-Packard Company, Palo Alto, Calif.

[21] Appl. No.: 09/033,352

[22] Filed: Mar. 2, 1998

[51] Int. Cl.⁶ .................................................. G11B 23/087
[52] U.S. Cl. ...................... 242/348; 242/338.1; 242/343; 242/345.2
[58] Field of Search ................................ 242/338, 338.1, 242/343, 343.1, 343.2, 348; 360/132, 134

[56] References Cited

U.S. PATENT DOCUMENTS

| | | | |
|---|---|---|---|
| 3,066,880 | 12/1962 | Bauer | 242/338.1 |
| 3,625,455 | 12/1971 | Streets | 242/345 |
| 3,686,470 | 8/1972 | Stahlberg et al. | 242/342 |
| 3,706,426 | 12/1972 | Prahl | 242/343 |
| 3,871,755 | 3/1975 | Wright | 242/342 |
| 3,873,193 | 3/1975 | Iida et al. | 242/342 |
| 3,883,090 | 5/1975 | Hall, Sr. | 242/340 |
| 3,894,796 | 7/1975 | Cook et al. | 242/342 |
| 4,033,523 | 7/1977 | Roman | 242/338.1 |
| 4,832,285 | 5/1989 | Oishi et al. | 242/338.3 |
| 4,896,238 | 1/1990 | Oogi et al. | 242/345.2 |
| 5,027,249 | 6/1991 | Johnson et al. | 242/345.2 |
| 5,297,754 | 3/1994 | Albrecht et al. | 242/343 |
| 5,400,981 | 3/1995 | Rambosek et al. | 242/348 |
| 5,436,782 | 7/1995 | Sieben | 242/338.1 |

*Primary Examiner*—John P. Darling

[57] ABSTRACT

A tape cartridge and reel lock that allows the reel lock to be released away from the center of rotation of the tape reel while keeping the frictional interface between the moving and fixed parts at the center of rotation of the reel. The tape cartridge includes a housing, a tape reel rotatably disposed in the housing, a tape drive interface on the reel, a rotatably fixed locking member operatively coupled to the reel and a release mechanism engagable by the tape drive at the tape drive interface on the reel. The release mechanism is movable between a first position in which the release mechanism is not engaged by the tape drive and the locking member is locked and a second position in which the tape drive engages the release mechanism and the locking member is unlocked.

17 Claims, 7 Drawing Sheets

TAPE CARTRIDGE REEL LOCK

FIELD OF THE INVENTION

The invention relates generally to tape cartridges and, more particularly, to a tape cartridge reel lock that prevents rotation of the tape reel when the cartridge is not installed in a tape drive.

BACKGROUND OF THE INVENTION

A widely used medium for storing data is magnetic tape. Tape cartridges are one of the most popular formats for storing data on tape. Tape cartridges are usually smaller and less expensive than reel-to-reel tapes. Two widely used tape cartridges are the dual reel cartridge and the single supply reel cartridge. In a dual reel tape cartridge, both the supply reel and the take-up reel are housed in the cartridge. In a single supply reel tape cartridge, the take-up reel is built into the tape drive along with an automatic tape threading mechanism.

When a tape cartridge is not in use in a tape drive or tape player, it is possible for the reel(s) to rotate idly and cause the tape to lose tension and become partially unwound from the reel. To avoid this problem, tape cartridges usually include some type of reel lock. One common type of reel lock uses one or more pawls to engage teeth formed around the outer edge of one of the reel flanges. VHS, Hi-8 and DLT style tape cartridges commonly use this type of lock. En these cartridges, the lock is released as the cartridge is installed in the tape drive or player and, therefore, the tape reel may be unlocked before the tape drive engages the reel. The moment at which the tape drive engages the reel and can control the angular position and velocity of the reel is the most desirable time to release the lock. The IBM 3480 single reel cartridge, for example, uses a locking mechanism with mating coaxial gears formed at the hub of the reel rather than at the outer edge of the reel. The mating gears are separated to unlock the reel as the tape drive engages the reel hub. The lock is released when a post on the rotor of the drive motor presses a small lock button at the center of the reel hub. The lock button is surrounded by a protective shroud to help prevent the inadvertent release of the lock when the cartridge is not installed in the tape drive. The shroud is flush with the reel teeth to minimize the cartridge drop required to engage the reel with the motor drive gear in a low profile tape drive. Although this design is advantageous because the lock is not released until the drive mechanism engages the reel hub, the shroud occupies valuable space that might otherwise be used for the drive motor and its bearings.

SUMMARY OF THE INVENTION

The present invention is directed to a novel tape cartridge and reel lock that allows the reel lock to be released away from the center of rotation of the tape reel while keeping the frictional interface between the moving and fixed parts at the center of rotation of the reel. In one embodiment of the invention, the tape cartridge includes a housing, a tape reel rotatably disposed in the housing, a tape drive interface on the reel, a rotatably fixed locking member operatively coupled to the reel and an actuator operatively coupled to the locking member. The tape drive interface, typically a ring gear, is accessible through the housing. The locking member is movable between a locked position in which the locking member engages the reel to prevent rotation and an unlocked position in which the locking member does not engage the reel and the reel is free to rotate. The actuator includes a release mechanism engagable by the tape drive at the tape drive interface on the reel. The release mechanism is movable between a first position in which the release mechanism is not engaged by the tape drive and the locking member is locked and a second position in which the tape drive engages the release mechanism and the locking member is unlocked.

In a second embodiment, the cartridge includes a housing, a tape reel rotatably disposed in the housing, a first "reel" gear operatively connected to the tape reel, a second "locking" gear rotationally fixed to the housing, an engagement mechanism, such as a post or a set of gear teeth, on the reel gear for engaging the teeth on the locking gear, and a washer interposed between the reel gear and the locking gear. One or more holes are formed through the teeth in the reel gear. Legs on the washer project into the holes in the reel gear. In operation, the locking gear is biased against the engagement mechanism on the reel gear to lock the reel into the rotationally fixed locking gear. As the drive motor gear in a tape drive engages the reel gear, the teeth of the drive motor gear push the washer legs up to drive the washer into the locking gear. This action moves the locking gear up and off the engagement mechanism to unlock the reel. The invented reel lock is advantageous because it does not occupy any vertical space in the drive train, it is difficult to release until the cartridge is engaged by the tape drive and the wear mechanism is entirely within the tape cartridge.

DETAILED DESCRIPTION OF THE INVENTION

Figure 1:
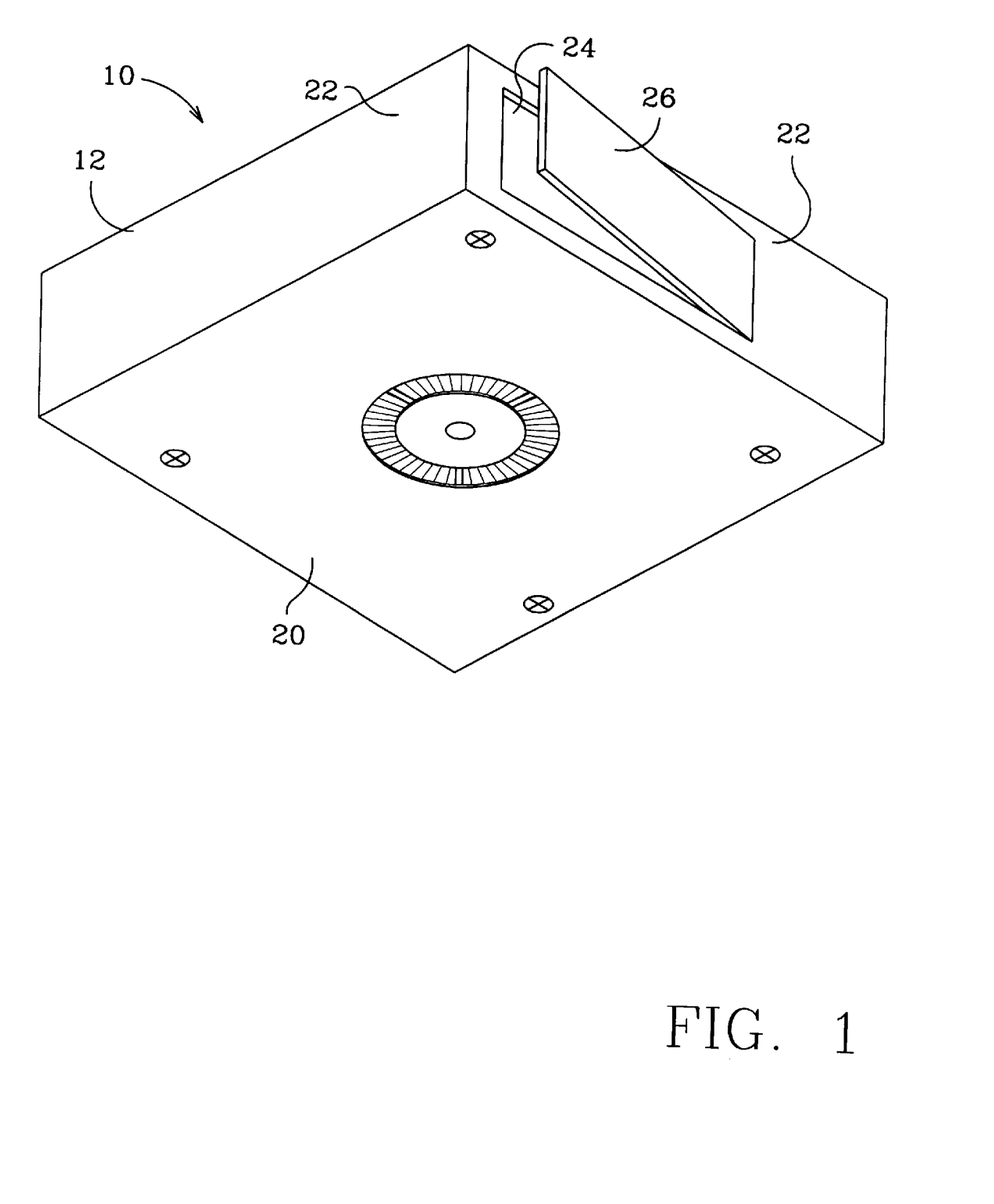
FIG. 1 is a perspective bottom side view of a single supply reel tape cartridge incorporating the reel lock of the present invention.
Figure 2A:
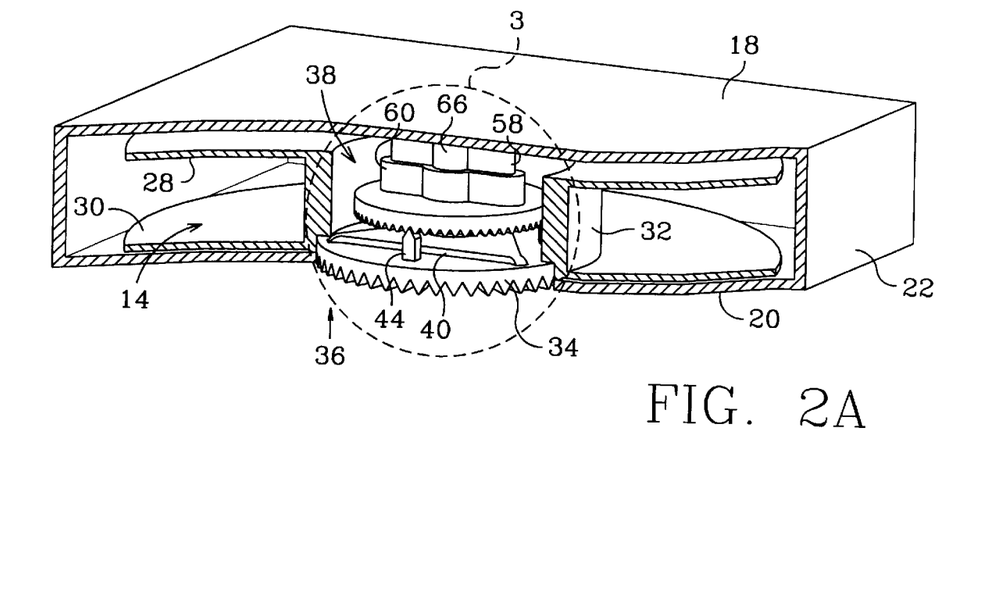
FIGS. 2a and 2b are cross section perspective views of the tape cartridge of FIG. 1 showing one embodiment of the reel lock in the locked and unlocked positions, respectively.
Figure 2B:
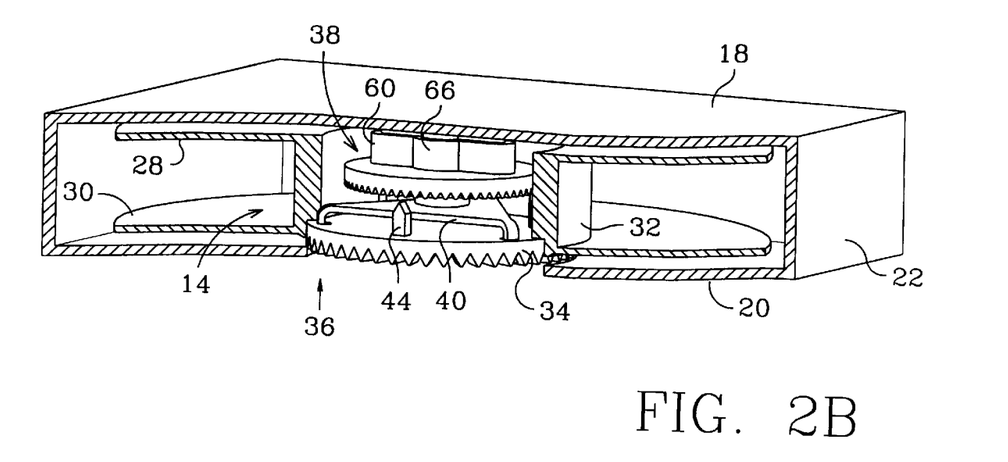
Figure 3:
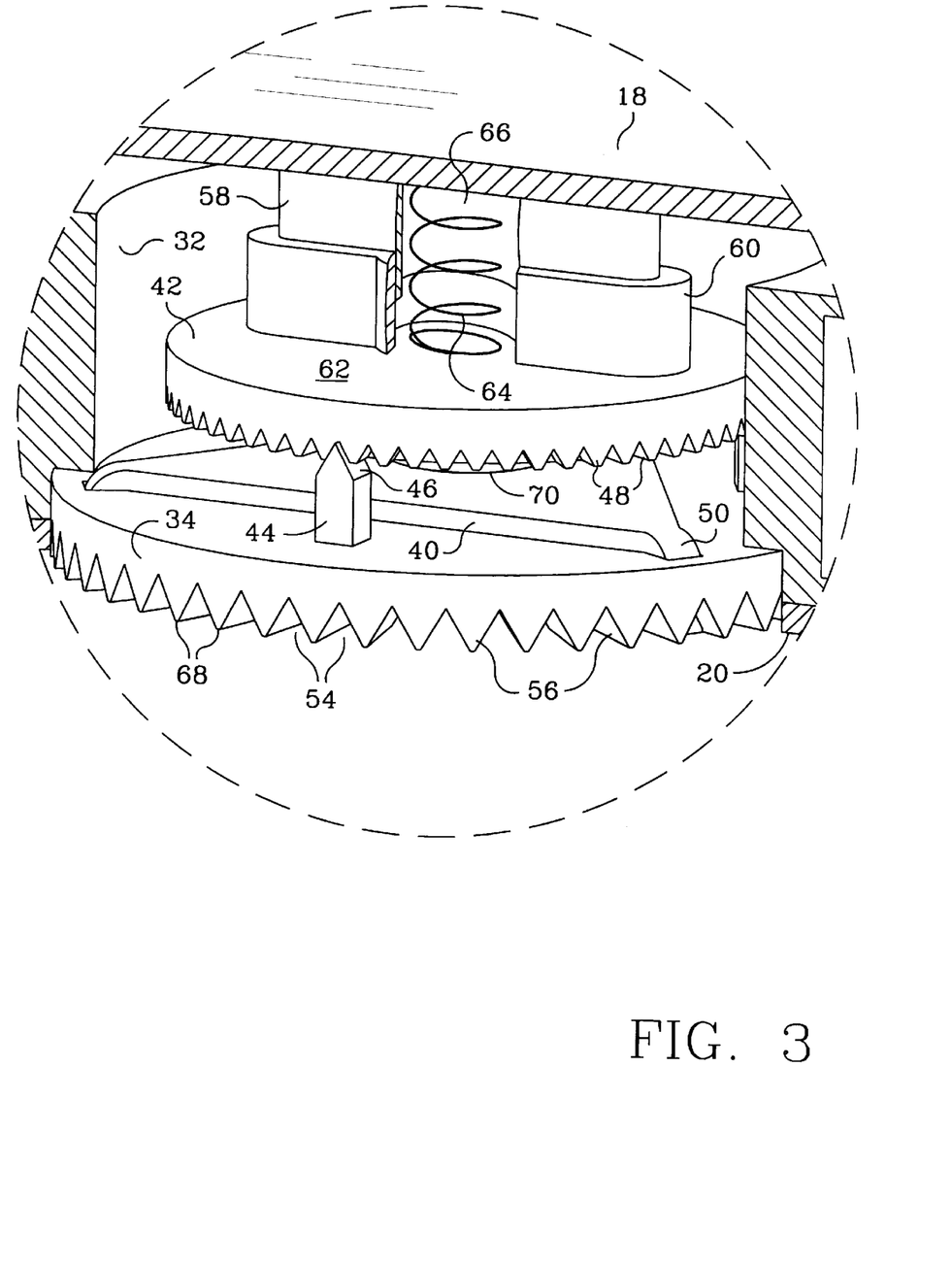
FIG. 3 is a partial cut-away detail view of the reel lock of FIG. 2a showing a spring type biasing mechanism.
Figure 4A:
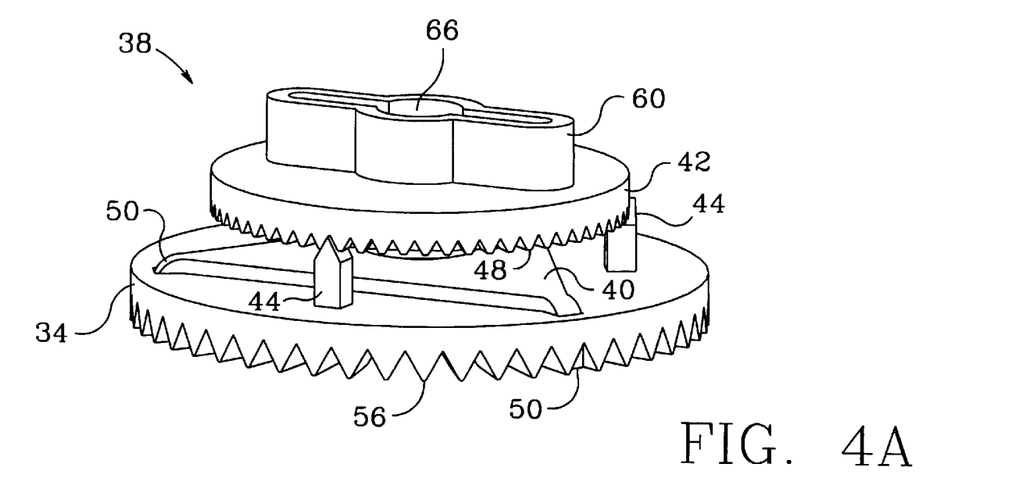
FIGS. 4a and 4b are top perspective views of the reel lock of FIGS. 2a and 2b.
Figure 4B:
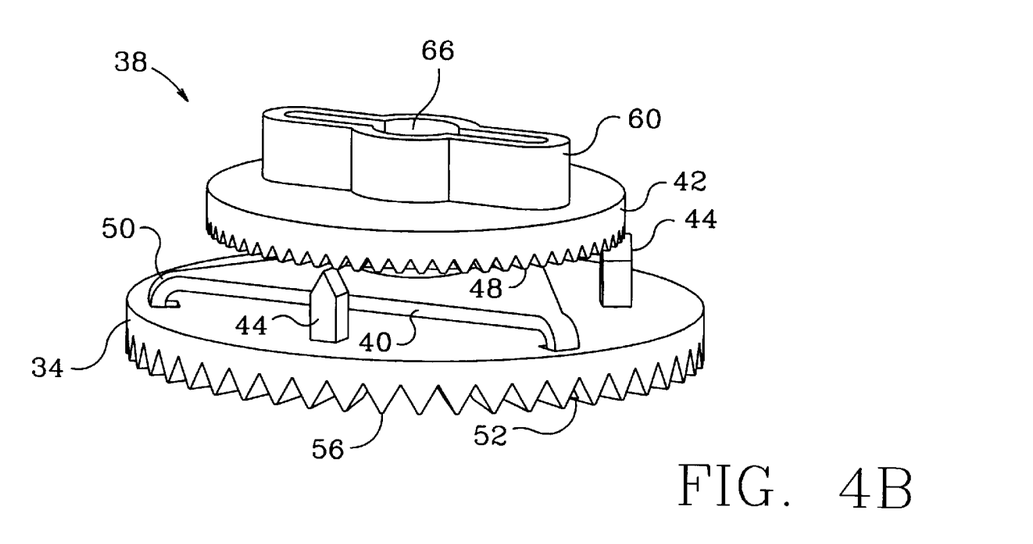

Referring to FIGS. 1, 2a and 2b, a single reel tape cartridge 10 includes a housing 12, a tape supply reel 14. Housing 12 is a rectangular box-like structure configured to enclose a single reel of tape. Housing 12 is usually formed of plastic molded into two segments—a cover segment and a base segment. To better illustrate the invented reel lock, however, housing 12 will be described with reference to a top portion 18, an opposing parallel bottom portion 20 and sidewalls 22 extending between the top and bottom portions 18 and 20. A tape (not shown) accessible to a tape drive (not shown) through access window 24. A door 26 covers access window 24 when cartridge 10 is not installed in a tape drive.

Referring to FIGS. 2a and 2b, tape reel 14 includes disc shaped top and bottom flanges 28 and 30 and an annular hub 32. A circular reel gear 34 is positioned at the bottom of hub 32. Reel gear 34 is the operative interface between the tape drive and the tape reel. Reel gear 34 is engaged by a mating coaxial gear in the drive mechanism of a tape drive. Reel gear 34 is accessed by the tape drive through an opening 36 in the bottom 20 of housing 12. Although reel gear 34 is usually formed as an integral part of reel hub 32, it may be constructed as a discrete component operatively connected to reel hub 32.

Figure 8:
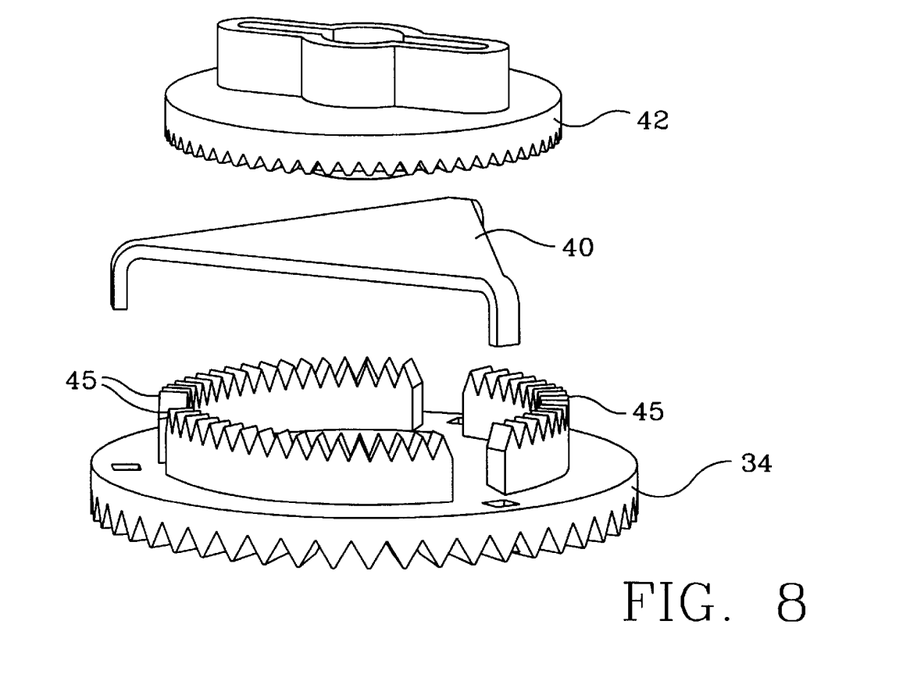
FIG. 8 is a top perspective exploded view of an alternative embodiment of the reel lock in which the operative engagement between the locking gear and the reel gear is made by a full set of gear teeth on the top of the reel gear.
Figure 9:
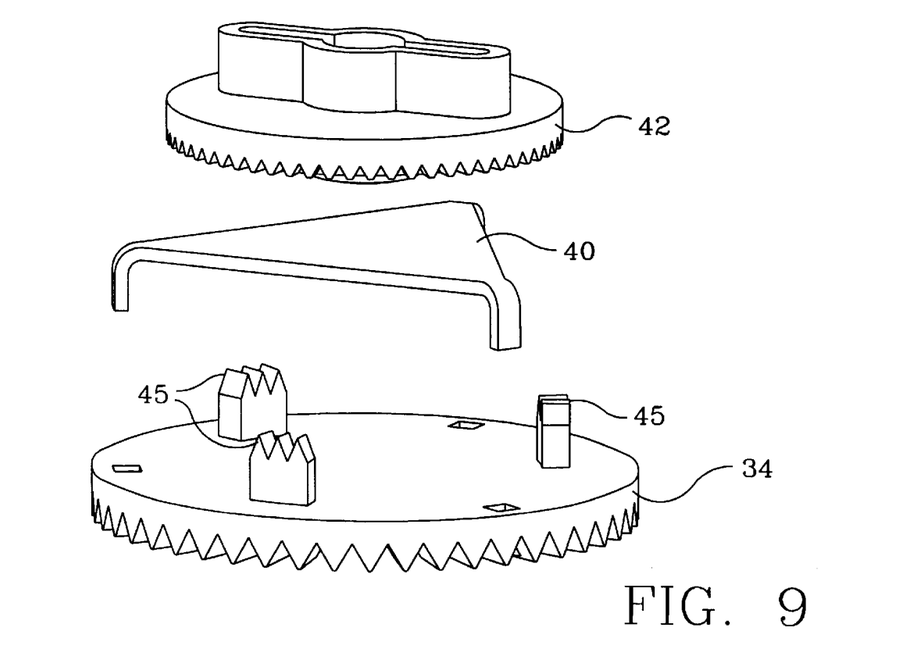
FIG. 9 is a top perspective exploded view of an alternative embodiment of the reel lock in which the operative engagement between the locking gear and the reel gear is made by partial sets of gear teeth on the top of the reel gear.

Referring now to FIGS. 2–7, reel lock 38 includes a spider washer 40, a locking gear 42 and locking posts 44 positioned at spaced apart locations around the top of reel gear 34. The ends 46 of locking posts 44 are sized and shaped to fit into locking gear teeth 48. It is expected that three locking posts 44 spaced at equal intervals around reel gear 34 will be sufficient in most applications for robust locking. It an alternative embodiment illustrated in FIGS. 8 and 9, gear teeth 45 on the top of reel gear 34 are used to engage locking gear teeth 48 instead of the posts used in the embodiment shown in FIGS. 2–7. Gear teeth 45 may be a full set of teeth with openings for spider washer 40 as shown in FIG. 8, or partial sets of teeth as shown in FIG. 9. Other suitable structures could also be used to achieve this operative engagement between locking gear 42 and reel gear 34. For example, instead of using a locking gear 42, this locking member could be constructed as a flat disk having one or more posts projecting down to engage teeth on top of the reel gear.

Figure 5A:
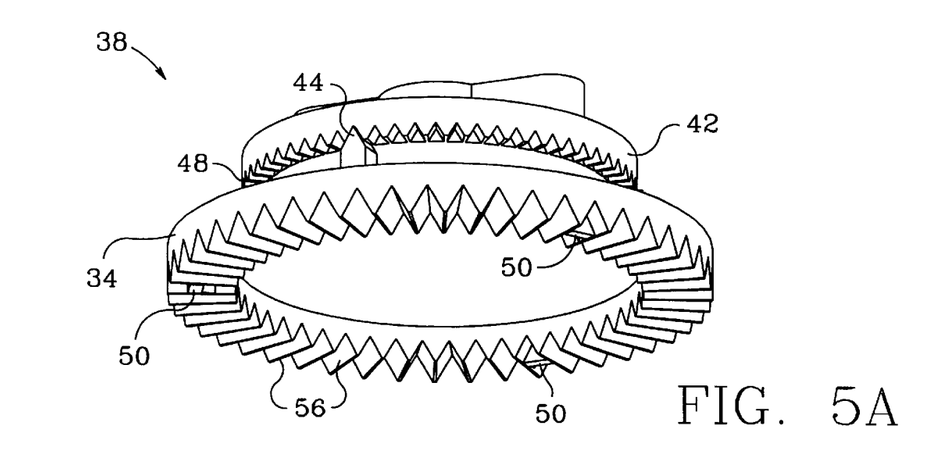
FIGS. 5a and 5b are bottom perspective views of the reel lock of FIGS. 2a and 2b showing the legs of the spider washer in the locked and unlocked positions, respectively.
Figure 5B:
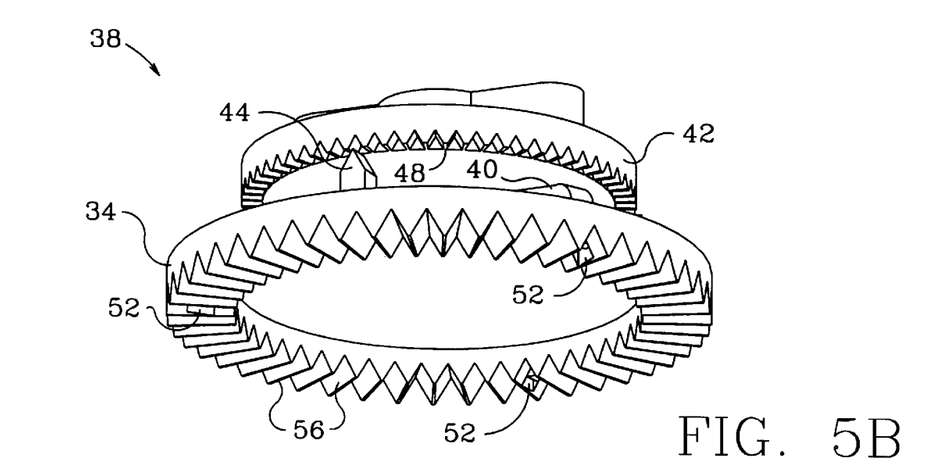
Figure 6:
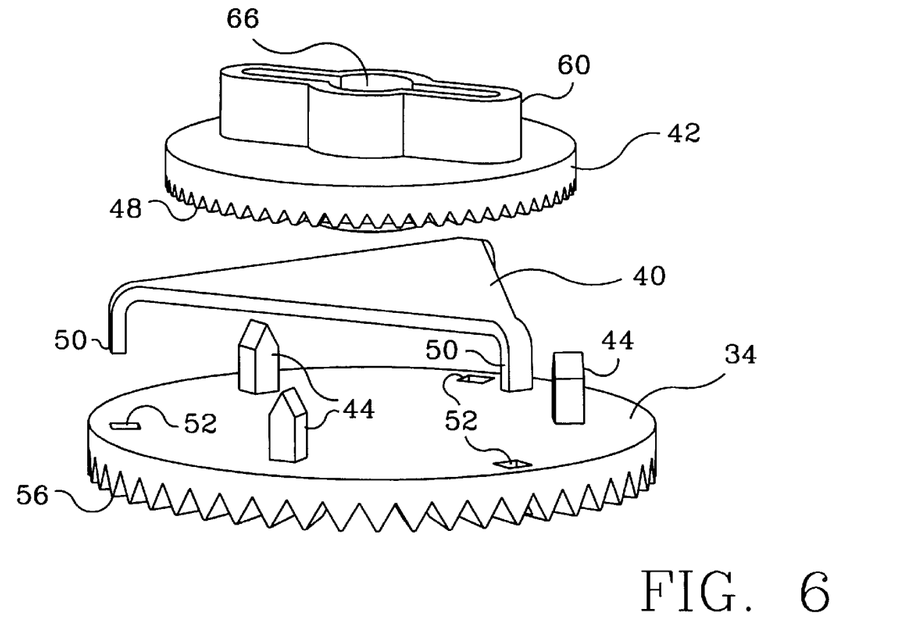
FIG. 6 is a top perspective exploded view of the reel lock of FIGS. 2a and 2b.
Figure 7:
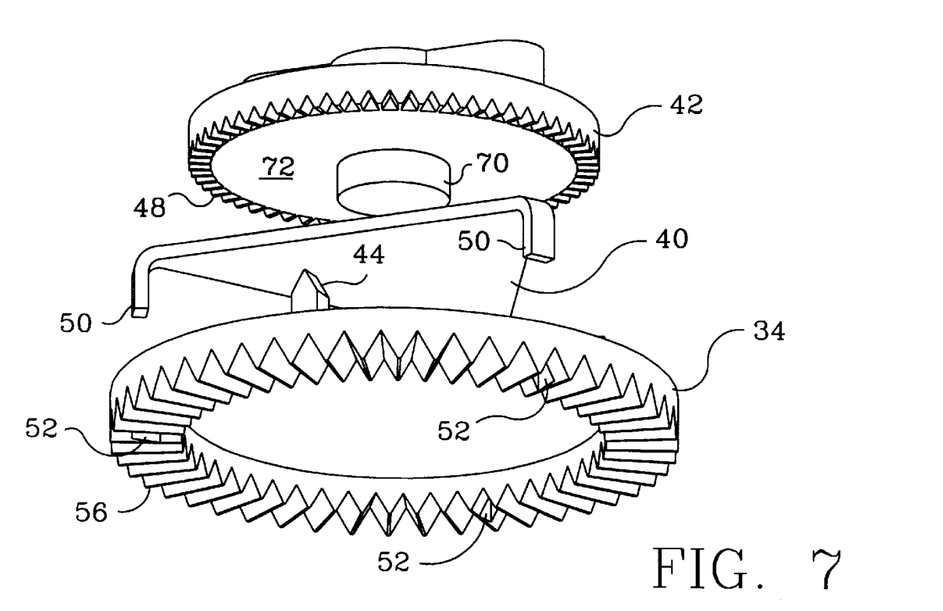
FIG. 7 is a bottom perspective exploded view of the reel lock of FIGS. 2a and 2b.

Referring again to FIGS. 2–7, legs 50 of spider washer 40 project through holes 52 in reel gear 34. Holes 52 are positioned at the gaps 54 between reel gear teeth 56. Spider legs 50 project into gaps 54 between reel gear teeth 56, as best seen in FIG. 5a. Preferably, each hole 52 and correspondingly each spider leg 50 spans the gap 54 between adjacent gear teeth to prevent jamming in the teeth of the tape drive gear. Each hole 52 and spider leg 50 could also be made to span two or more gaps 54, in which case hole 52 would extend through one or more gear teeth.

Locking gear 42 is moveable in only one dimension, parallel to the axis of rotation of reel 14. Locking gear 42 is fixed in the other dimensions by its attachment to cartridge housing 12 which, in the embodiment shown in the Figures, includes interlocking structures 58 and 60. A male key shaped structure 58 is formed on or integral with top portion 18 of housing 12. A mating female key shaped structure 60 is formed on or integral with the top 62 of locking gear 42. Female structure 60 on locking gear 42 receives male structure 58 on cartridge housing 12 to fix locking gear 42 into position over spider washer 40 and locking posts 44. A biasing spring 64 is positioned between cartridge housing 12 and locking gear 42 in a central compartment 66 of interlocking structures 58 and 60. Spring 64 urges locking gear 42 against spider washer 40 and locking posts 44. This biasing mechanism pushes spider legs 50 down into reel gear teeth 56 and keeps reel lock 38 locked when tape cartridge 10 is not installed in a tape drive. Although key shaped mating structures with a central biasing spring are shown, any suitable interlocking structure and biasing mechanism may be used to fix locking gear 42 into position over spider washer 40 and locking posts 44.

In operation, as the drive motor gear in a tape drive engages reel gear 34, the tips of the drive motor gear push on spider legs 50 to drive spider washer 40 up into reel gear 34. This action moves lock gear 42 up and off locking posts 44 to unlock reel lock 38. Spider washer 40 and biasing spring 64 serve as the actuator for reel lock 38. Spider washer 40 acts as a release mechanism to disengage the locking member, lock gear 54, from reel 14 and unlock reel lock 38 when the tape drive engages the reel 14. Spring 64 serves as a biasing mechanism to urge the locking member, lock gear 42, towards the locked position.

It is desirable that spider legs 50 project out flush with the tips 68 of reel gear teeth 56 to maximize the vertical travel of locking gear 42 when reel gear 34 is engaged by the tape drive. The depth of locking gear teeth 48 should be slightly less than the depth of reel gear teeth 56 (or less than the distance spider legs 50 project into gaps 54 in reel gear teeth 56 if less than the full depth of the teeth) to ensure locking gear 42 clears locking posts 44 to fully release the lock 50. Forces are transmitted between locking gear 42 and spider washer 40 through a button 70 on the bottom 72 of locking gear 42. The frictional interface/bearing surface between spider washer 40, which rotates with tape reel 14, and locking gear 42, which is rotationally fixed to cartridge housing 12, occurs at button 70. The frictional interface at button 70 is at the center of rotation of the reel so the radius of button 70 can be made small to minimize frictional drag and wear.

"Teeth" means any sharp angled, rounded or other combination of protrusions and indentations.

There has been shown and described several embodiments of a novel tape cartridge and reel lock that allows the reel lock to be actuated away from the center of rotation of the tape reel while keeping the frictional interface between the moving and fixed parts at the center of rotation of the tape reel. The invented reel lock is advantageous because it does not occupy any vertical space in the drive train, it is difficult to release until the cartridge is engaged by the tape drive and the wear mechanism is entirely within the tape cartridge. Various modifications may be made to the above described embodiments and, while the reel lock has been described with reference to a single reel tape cartridge such as the one illustrated in FIG. 1, the lock may be used in various other types of tape cartridges in which the drive mechanism in the tape drive or tape player engages the reel (or both reels in a dual reel cartridge) to move the tape. It will, therefore, be understood that these and other modifications and variations are possible without departing from the spirit and scope of the invention as expressed in the following claims.

What is claimed is:

1. A tape cartridge, comprising:

a housing;

a tape reel rotatably disposed in the housing, the reel having a center of rotation;

a tape drive interface on the reel, the tape drive interface accessible through the housing and configured to drivingly couple the reel to a tape drive;

a rotatably fixed locking member operatively coupled to the reel, the locking member movable between a locked position in which the locking member engages the reel to prevent rotation and an unlocked position in which the locking member does not engage the reel and the reel is free to rotate; and an actuator operatively coupled to the locking member, the actuator comprising a release mechanism engagable by the tape drive at the tape drive interface, the release mechanism movable between a first position in which the release mechanism is not engaged by the tape drive and the locking member is locked and a second position in which the tape drive engages the release mechanism and the locking member is unlocked.

2. A cartridge according to claim 1, wherein the actuator is operatively coupled to the locking member at the center of rotation of the tape reel.

3. A cartridge according to claim 2, wherein the release mechanism bears on the locking member at the center of rotation of the tape reel.

4. A cartridge according to claim 1, wherein the actuator further comprises a biasing mechanism urging the locking member towards the locked position.

5. A cartridge according to claim 1, wherein the actuator further comprises a biasing mechanism urging the locking member towards the locked position and the release member towards the first position.

6. A tape cartridge, comprising:
 a housing;
 a reel rotatably disposed in the housing;
 a first gear operatively connected to the reel, the first gear having one or more holes therethrough positioned near a periphery of the first gear;
 a second gear rotationally fixed to the housing, the second gear having gear teeth;
 an engagement means on the first gear for engaging the teeth on the second gear; and
 a washer operatively coupled to the first gear, the washer interposed between the first gear and the second gear and the washer having at least one leg projecting into the one or more holes in the first gear.

7. A cartridge according to claim 6, wherein the engagement means comprises at least one post projecting from the first gear.

8. A cartridge according to claim 6, wherein the engagement means comprises gear teeth.

9. A cartridge according to claim 6, wherein the second gear bears on the washer.

10. A cartridge according to claim 9, wherein the washer has a center of rotation co-extensive with a center of rotation of the first gear and the second gear bears on the washer at the center of rotation of the washer.

11. A cartridge according to claim 6, further comprising a biasing mechanism urging the second gear against the washer.

12. A cartridge according to claim 11, wherein the biasing mechanism is a spring disposed between the housing and the second gear.

13. A tape cartridge, comprising:
 a housing;
 a reel rotatably disposed in the housing, the reel having an annular hub around a center of rotation of the reel and a plurality of spaced apart parallel flanges extending out from the hub;
 a first gear fixedly connected to the bottom of the reel hub, the first gear having gear teeth on a bottom side, a plurality of locking projections projecting from a top side, and a plurality of holes therethrough, each hole positioned at the location of a gap between the first gear teeth;
 a second gear rotational fixed to the housing, the second gear having second gear teeth engageable with the projections on the first gear; and
 a spider washer interposed between the first gear and the second gear, the spider washer having a plurality of legs projecting into the holes in the first gear and the spider washer bearing on the second gear at the center of rotation of the reel.

14. A cartridge according to claim 13, wherein the second gear is movable between a locked position in which the second gear engages the projections to prevent rotation of the reel and an unlocked position in which the second gear does not engage the projections and the reel is free to rotate.

15. A cartridge according to claim 13, wherein the spider washer is movable between a first position in which the legs of the spider washer extend down into the gaps between teeth in the first gear and the second gear is in the locked position and a second position in which the legs of the spider washer do not extend down into the gaps between teeth in the first gear and the second gear is in the unlocked position.

16. A cartridge according to claim 13, wherein the locking projections comprise gear teeth.

17. A cartridge according to claim 13, wherein the locking projections comprise one or more posts.

* * * * *